United States Patent
Moudgal et al.

(10) Patent No.: US 6,526,485 B1
(45) Date of Patent: Feb. 25, 2003

(54) APPARATUS AND METHOD FOR BAD ADDRESS HANDLING

(75) Inventors: Anuradha N. Moudgal, Fremont, CA (US); Belliappa M. Kuttanna, Austin, TX (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/368,008

(22) Filed: Aug. 3, 1999

(51) Int. Cl.[7] ........................... G06F 12/00; G06F 12/12
(52) U.S. Cl. ...................... 711/159; 711/156; 711/135; 711/133; 711/163
(58) Field of Search ............................... 711/154, 156, 711/144, 146, 135, 159, 163, 133

(56) References Cited

U.S. PATENT DOCUMENTS

| | | | | |
|---|---|---|---|---|
| 5,848,433 A | * | 12/1998 | Tran et al. | 711/137 |
| 5,860,104 A | * | 1/1999 | Witt et al. | 711/137 |
| 5,898,854 A | * | 4/1999 | Abramson et al. | 711/135 |
| 6,438,673 B1 | * | 8/2002 | Jourdan et al. | 711/213 |
| 2001/0056530 A1 | * | 12/2001 | Harris | 712/220 |

OTHER PUBLICATIONS

Software support for speculative loads. Anne Rogers , Kai Li. ACM SIGPLAN Notices , Proceedings of the fifth international conference on Architectural support for programming languages and operating systems. Sep. 1992. vol. 27.*

* cited by examiner

Primary Examiner—Matthew Kim
Assistant Examiner—Matthew D. Anderson
(74) Attorney, Agent, or Firm—Pennie & Edmonds LLP (57) ABSTRACT

Circuitry including a request queue and a bad address handling circuit. The request queue includes an entry for each outstanding load requesting access to a cache. Each request queue entry includes a valid bit, an issue bit and a flush bit. The state of the valid bit indicates whether or not the associated access request should be issued to the cache. The issue bit indicates whether the load access request has been issued to the cache and the flush bit indicates whether the data retrieved from the cache in response to the request should be loaded into a specified register. The bad address handling circuit responds to a replay load request by manipulating the states of the valid or flush bit of the relevant request queue entry to prevent completion of bad consumer load requests. The bad address handling circuit includes a validation circuit and a flush circuit. The validation circuit alters the state of the valid bit of the relevant request queue entry in response to the replay load request based upon the state of issue bit for that request queue entry. If the issue bit indicates that the load access request has not yet been issued to the cache, then the validation circuit alters the state of the associated valid bit to prevent the issuance of that load access request to the cache. On the other hand, if the bad consumer has already been issued to the cache, then the flush circuit responds by altering the state of the flush bit to prevent the data retrieved from the cache in response to the bad consumer from being loaded into the register file.

11 Claims, 7 Drawing Sheets

| Request Q ID | Command | Address | Register |
|---|---|---|---|
| I1 | Ld | [A] | R1 |
| I2 | Ld | [B] | R2 |
| I3 | Ld | [E] | R5 |
| I2 | Ld | [C] | R2 | t1: {I1, I2}
t2: {I3, I2}

| Address | Data |
|---|---|
| A | 1010 |
| B | 0000 |
| C | 1111 |

| Register | Data |
|---|---|
| R1 | 1010 |
| R2 | XXXX |
| R1 | 1010 |
| R2 | 1111 |
| R1 | 1010 |
| R2 | 0000 | t2: {R1=1010, R2=XXXX}
t3: {R1=1010, R2=1111}
t4: {R1=1010, R2=0000}

|  | Request Q ID 62 | Address 63/ Reg | Valid Bit 64 | Issue Bit 65 | Flush Bit 66 |
|---|---|---|---|---|---|
| t5 | I1 | [A]/R1 | 1 | 0 | 0 |
| t5 | I2 | [B]/R2 | 1 | 0 | 0 |
| t6 | I1 | [A]/R1 | 0 | 1 | 0 |
| t6 | I2 | [B]/R2 | 1 | 0 | 0 |
| t7A | I1 | [A]/R1 | 0 | 1 | 0 |
| t7A | I2 | [B]/R2 | 1 -> 0 | 0 | 0 |
| t7A | I2 | [C]/R2 | 1 | 0 | 0 |
| t7B | I1 | [A] | 0 | 1 | 0 |
| t7B | I2 | [B]/R2 | 1 | 1 | 0 -> 1 |
| t7B | I2 | [C]/R2 | 1 | 0 | 0 |

(120: t7A rows; 122: t7B rows) — table 52

FIG. 7A

| Address | Data |
|---|---|
| A | 1010 |
| B | 0000 |
| C | 1111 | table 38

FIG. 7B

|  | Register | Data |
|---|---|---|
| t6 - t7A & t7B | R1 | 1010 |
| t6 - t7A & t7B | R2 | XXXX |
| t8 | R1 | 1010 |
| t8 | R2 | 1111 | table 28

FIG. 7C

APPARATUS AND METHOD FOR BAD ADDRESS HANDLING

FIELD OF THE INVENTION

The present invention relates to an apparatus and method for preventing data corruption in a processing unit that speculatively issues load requests. In particular, the present invention relates to an apparatus and method for preventing register data corruption resulting from the speculative issue of load requests without the correct addresses, followed by replay of such load requests.

BACKGROUND OF THE INVENTION

Figure 1:
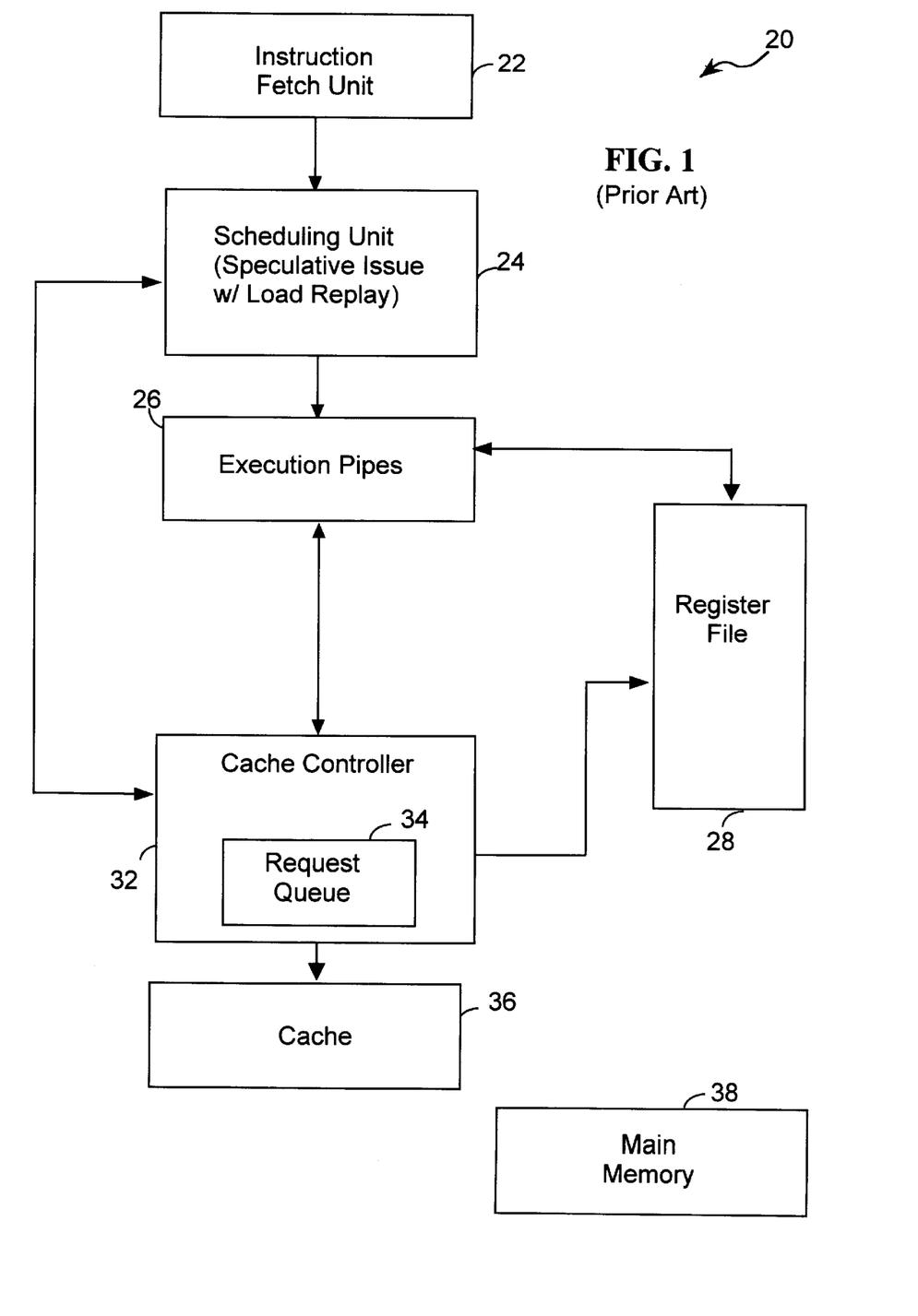
FIG. 1 illustrates a prior art processor that speculatively issues consumer loads and replays those with bad addresses.

FIG. 1 illustrates, in block diagram form, the architecture of Processor 20. Processor 20 includes Instruction Fetch Unit 22, Scheduling Unit 24, Execution Pipes 26, Register File 28, Cache Controller 32, Cache 36. Processor 20 communicates with Main Memory 38, as necessary to obtain information not available in cache 36. Instruction Fetch Unit 22 fetches instructions from instruction memory (not shown) and couples them to Scheduling Unit 24. Scheduling Unit 24 assigns an identifier (ID) to each instruction prior to coupling it to Execution Pipes 26, where each instruction is executed. Cache Controller 32 tracks outstanding access requests via Request Queue 34. In response to a cache hit, data may be loaded into Register File 28, which includes a number of registers.

Out-of-order (OOO) program execution enables Processor 20 to achieve execution speeds that would not be possible if instructions were executed in program order. The order in which Scheduling Unit 24 couples the instructions to Execution Pipes 26 is determined by the availability of necessary resources of Execution Pipes 26 for a particular instruction, rather than program order. Issuing load requests requires special handling by Scheduling Unit 24 because of the possibility of address dependence between two load requests. A load request shall be referred to as a "source" if it provides the address to be used in another load request. The load request taking its address from the source shall be referred to as a "consumer". To reduce execution time Scheduling Unit 24 assumes no register dependencies and speculatively issues a consumer load request to Execution Pipes 26 after issuance of, but prior to completion of, the associated source load request. This practice is referred to as speculative issuance. Speculative issuance causes no problem so long as both a source and its consumer load request hit in Cache 36. When that occurs, the source load request will complete execution prior to its consumer load request, thereby providing it with the correct address. However, if a source load request misses in Cache 36, then its associated speculatively issued consumer load request may complete execution first with an incorrect, or "bad", address for the data to be loaded into a register, thus loading the wrong data into the register.

Scheduling Unit 24 attempts to correct this problem by "replaying" the consumer load with the correct address after completion of its associated source load. (In the interests of brevity, in the following discussion a speculatively issued consumer load with a bad address will be referred to as a "bad consumer" and the replay of the bad consumer will be referred to as a "replay consumer".) A replay consumer resembles its associated bad consumer, including the same ID and register; however, the replay consumer includes a different, correct, address. Even with replay of bad consumer loads corruption of register data is possible. This is because there is no guarantee that a replay consumer will complete execution after the bad consumer that gave rise to it.

Figure 2A:
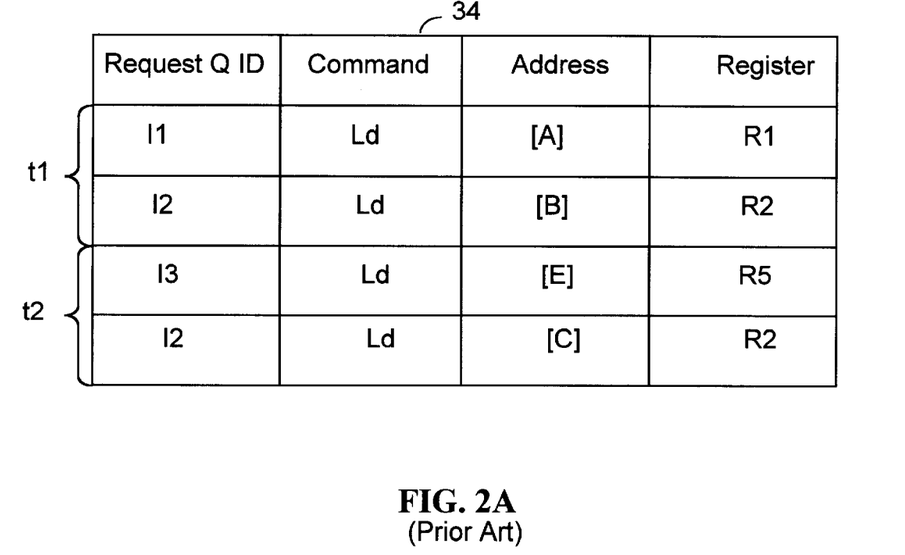
FIG. 2A illustrates, at various times, some of the contents of a request queue of the processor of FIG. 1.
Figure 2B:
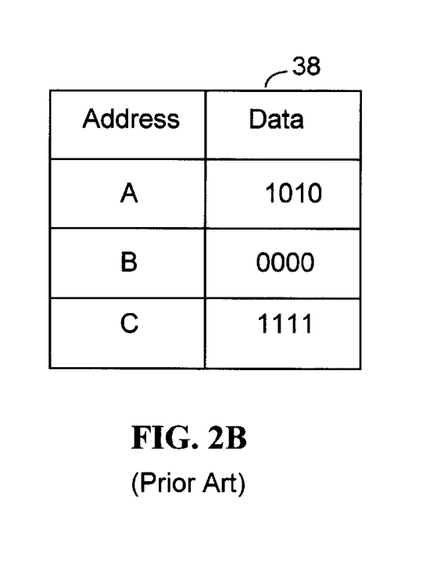
FIG. 2B illustrates some of the contents of the main memory of the processor of FIG. 1.
Figure 2C:
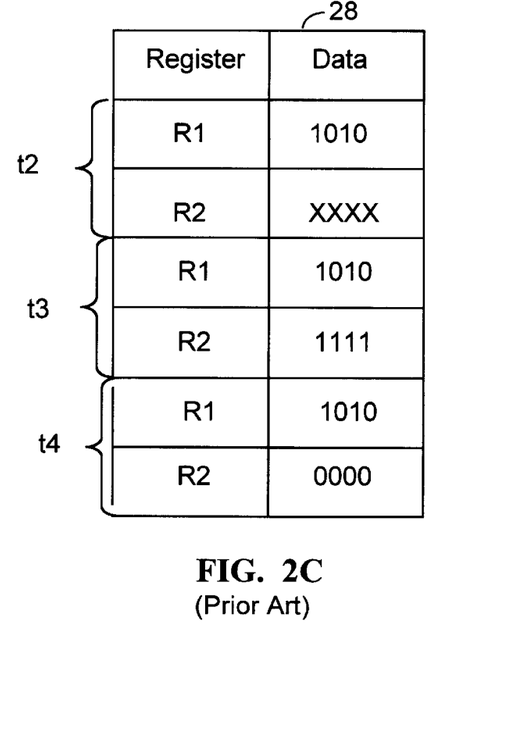
FIG. 2C illustrates, at various times, some of the contents of the register files of the processor of FIG. 1.

FIGS. 2A, 2B and 2C illustrate how register data corruption can occur when a bad consumer load and its associated replay consumer both miss in Cache 36. In these figures and the following discussion, the source load request as is identified as "I1". While both the consumer load request and its replay are assigned the ID "I2", the two can be distinguished by their addresses. Consumer load request I2 is initially issued with a bad address of B and it is subsequently determined that the correct address should have been C. Thus, in these figures the bad consumer is denoted as "I2 Ld [B], R2" and the replay consumer is denoted "I2 Ld [C], R2". At a time $\tau_1$ both I1 and I2 have missed in Cache 36. FIG. 2A illustrates that at time $\tau_1$ both the source and bad consumer load requests, I1 and I2, are pending in Request Queue 34. Sometime after $\tau_1$ and prior to $\tau_2$, source I1 completes placing the data stored at address A of Main Memory 38 into register R1 of Register File 28. FIG. 2B reflects this showing a value of "$1010_b$" in R2 at $\tau_2$. Subsequently, Scheduling Unit 24 realizes that consumer load I2 was issued with a bad address and so issues a replay request with the correct address; i.e, Scheduling Unit 24 issues "I2 Ld [C], R2". FIG. 2A reflects that at time $\tau_2$ the replay consumer has also been forwarded to Request Queue 34. At this time the bad consumer still has not completed. At $\tau_3$ the replay consumer load completes, writing the value for address C of Main Memory 38, $1111_b$, into register R2 of Register File 28, as illustrated in FIG. 2C. This is the correct data. At $\tau_4$ the bad consumer completes, corrupting the data in register R2 of Register File 28 by overwriting it with the value for address B of Main Memory 38, $0000_b$, as illustrated in FIG. 2C. While the preceding discussion of register data corruption was based upon a processor with a single level cache, the problem also occurs under similar circumstances in processors with multiple levels of cache.

Thus, a need exists for a means of preventing register data corruption arising from completion of bad consumer load requests.

SUMMARY OF THE INVENTION

Briefly described, the circuitry of the present invention includes a request queue and bad address handling circuit. The request queue includes an entry for each outstanding load requesting access to a cache. Each request queue entry includes a valid bit, an issue bit and a flush bit. The state of the valid bit indicates whether or not there is a valid request associated with the entry. The issue bit indicates whether the load request has been issued to the cache and the flush bit indicates whether the data received in response to the request should be forwarded to the register file. The bad address handling circuit responds to a replay load request by manipulating the state of the valid or flush bit of the relevant request queue entry to prevent completion of bad consumer load requests. The bad address handling circuit includes a validation circuit and a flush circuit. The validation circuit alters the state of the valid bit of the relevant request queue entry in response to the replay load request based upon the state of issue bit for that request queue entry. If the issue bit indicates that the load access request has not yet been issued to the cache, then the validation circuit alters the state of the associated valid bit to prevent the issuance of that load access request to the cache. On the other hand, if the bad consumer has already been issued to the cache, then the flush circuit responds by altering the state of the flush bit to prevent the data received in response to the bad consumer from being loaded into the register file. Thus, the circuitry of the present invention prevents completion of a speculatively issued consumer load request with a bad address for which a replay has been initiated. By doing so, the circuitry of the present invention prevents corruption of register data that can occur when the bad consumer load request is allowed to complete after its associated replay.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 3:
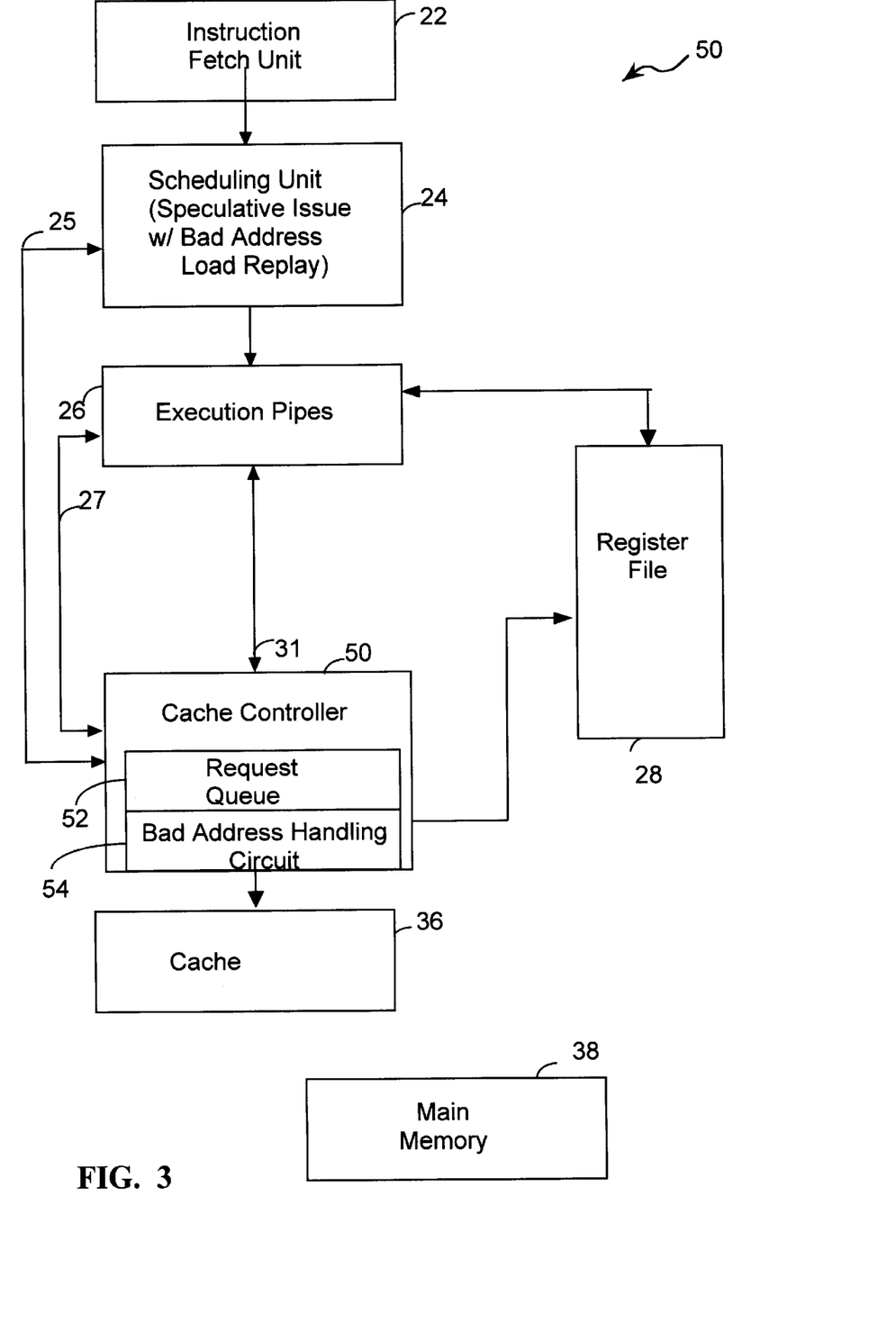
FIG. 3 illustrates a processor incorporating the request queue and bad address handling circuit of the present invention.

FIG. 3 illustrates Processor 50, which incorporates the Request Queue 52 and Bad Address Handling Circuit 54 of the present invention. The present invention prevents register data corruption from occurring even though Scheduling Unit 24 speculatively issues consumer load requests and replays those speculatively issued consumer load requests having bad addresses. By manipulating the contents of Request Queue 52, Bad Address Handling Circuit 54 prevents completion of any outstanding bad consumer when a replay of it has been initiated. Request Queue 52 and Bad Address Handling Circuit 54 will be described in detail with respect to FIGS. 4–7.

A. Overview

Referring once more to FIG. 3, Processor 50 corresponds generally to prior art Processor 20. Request Queue 52 differs from prior Request Queue 34 in that it includes 3 additional bits for each access request entry. The Valid, Issue, and Flush bits of each entry in Request Queue 52 enable Cache Controller 50 to terminate execution of any pending load request once a replay of that load has been initiated. Bad Address Handling Circuit 54 manipulates the states of the Valid and Flush bits based upon the state of the Issue bit to prevent data retrieved in response to a bad consumer from being loaded into Register File 28 and, if possible, from even being issued to Cache 36.

B. The Request Queue and Bad Address Handling Circuit

Figure 4:
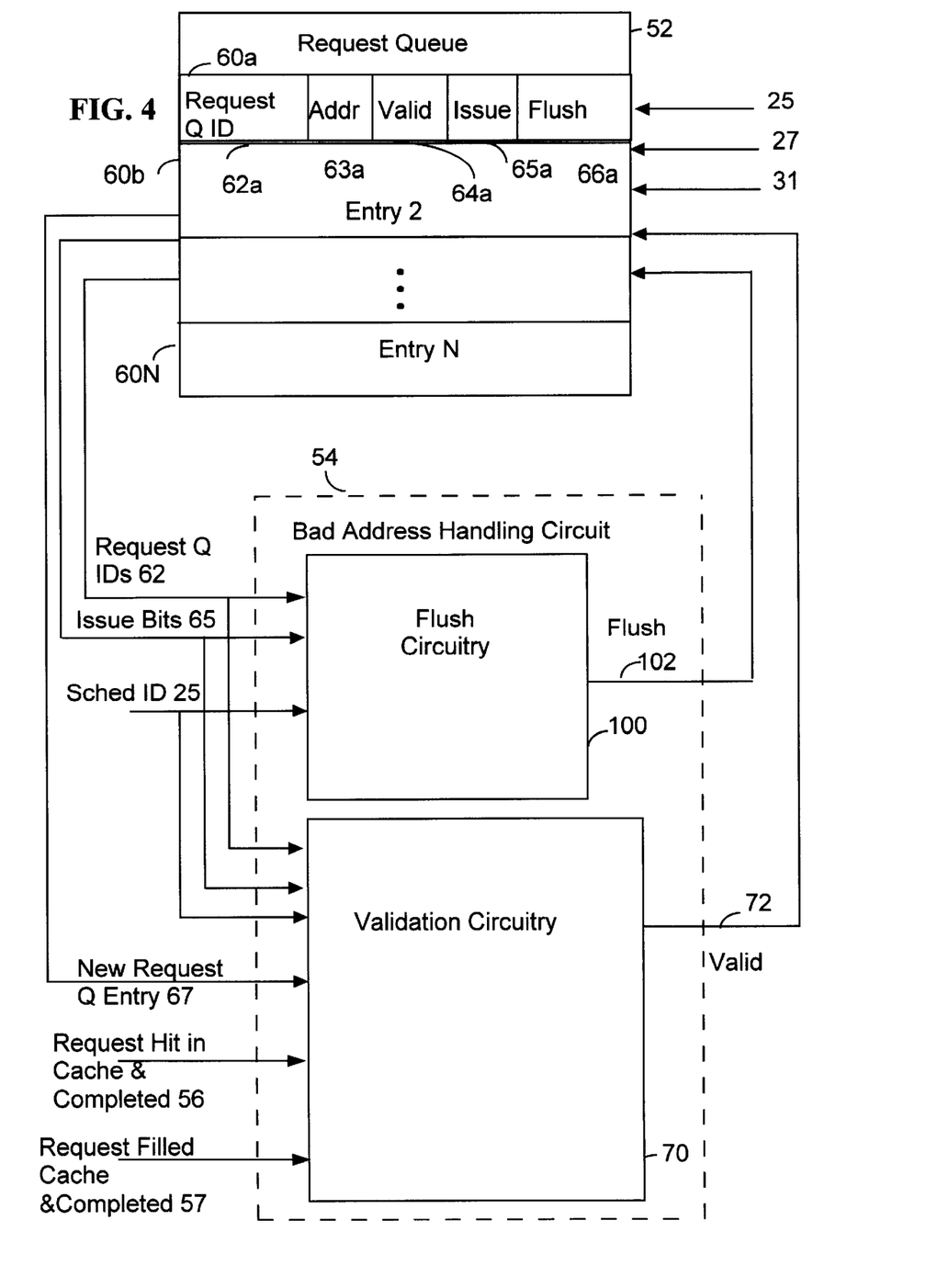
FIG. 4 illustrates an embodiment the request queue and bad address handling circuit of the present invention.

FIG. 4 illustrates in greater detail Request Queue 52 and Bad Address Handling Circuit 54. Request Queue 52 includes a memory device storing an entry 60 for each outstanding request for access to Cache 36. The maximum number, N, of entries 60 Request Queue 52 can support is a design choice. Each entry 60 contains information about a single outstanding cache access request, includes Request Q ID bits 62, Address bits 63, Valid bit 64, Issue bit 65, and Flush bit 66. Request Q ID bits 62 store the instruction ID assigned to the cache access request by Scheduling Unit 24. Because of bad consumer replay, more than one entry 60 in Request Queue 52 may represent the same instruction ID via its Request Q ID bits. Address bits 63 indicate the memory address to which the request seeks access. Valid bit 64 indicates whether or not the entry 60 with which it is associated is valid. If an entry 60 is not valid, then it will not be issued by Cache Controller 50 to Cache 36 for completion. Bad Address Handling Circuit 54 controls the state of Valid bit 64. Issue bit 65 indicates whether or not the load request associated with the entry has been issued to Cache 36. Cache Controller 50 controls the state of Issue bit 65, setting it to a "1" when a request is issued. Flush bit 66 indicates whether or not information retrieved from Cache 36 should be loaded into Register File 28. Bad Address Handling Circuit 54 controls the state of Flush bit 66.

Request Queue 52 creates a new entry 60 whenever a request from Execution Pipes 26 misses in a lower level cache and there is not yet an entry 60 with a Request Q ID matching the instruction ID of the request. Request Queue 52 stores the new entry 60 in the next available location. Request Queue 52 deems that a request issued to Execution Pipes 26 has missed in the lower level cache in response to assertion of both the signal Request-from-Pipes 27 and the signal Request-Missed-in-Lower-Level-Cache 1 31. Request Queue 52 asserts the Valid bit 64 for the new entry 60 by asserting the signal New Request Queue Entry 67, which it couples to Bad Address Handling Circuit 54.

Bad Address Handling Circuit 54 is so named because it is responsible for handling issues arising from the speculative issuance of load requests with bad, or incorrect, addresses. In response to identification of a bad consumer, Bad Address Handling Circuit 54 first determines whether the bad consumer has been issued to Cache 36. If not, Bad Address Handling Circuit 54 alters the state of the associated Valid bit 64 to prevent the bad consumer from being issued. On the other hand, if the bad consumer has been issued to Cache 36, then Bad Address Handling Circuit 54 alters the state of the Flush bit 66 of the entry 60 for the bad consumer so that the data retrieved from Cache 36 in response to it will not be loaded into Register File 28.

Bad Address Handling Circuit 54 includes Validation Circuitry 70 and Flush Circuitry 100. Validation Circuitry 70 includes N instances of a Validation Circuit, each associated with a single entry 60 of Request Queue 52. Validation Circuitry 70 controls the state of each Valid bit 64 via an associated output signal, each called Valid signal. Validation Circuitry 70 determines the state of each of its Valid signals based upon a number of factors. Validation Circuitry 70 asserts an entry's Valid signal when commanded to do so by Request Queue 52 as indicated by New Request Q Entry signal on line 67. Validation Circuitry 70 deasserts an entry's Valid Signal upon detection of a replay or upon completion of the entry's request. For each entry, Validation Circuitry 70 receives two signals from Cache 36 indicative of the instruction ID of a just completed cache access request. These signals are: Request-Hit-in-Cache-&-Completed signal on line 56, Request-Filled-Cache-&-Completed signal on line 57. Validation Circuitry 70 determines whether an entry 60 is the subject of a replay by comparing its associated Request Q ID bits 65 to the ID of an instruction issued by Scheduling Unit 24 to Execution Pipes 26, represented by Sched ID signal on line 25.

Flush Circuitry 100 includes N instances of a Flush Circuit, each of which is associated with a single entry 60 of Request Queue 52. Flush Circuitry 100 controls the state of each entry's Flush bit 66 via an associated Flush signal. Flush Circuitry 100 determines that an entry 60 should be flushed, rather than allowing the associated data to be loaded into Register File 28, when the request has already been issued to Cache 36 and a replay of the request has been initiated. The state of an entry's Issue bit 65a indicates whether or not the request has been issued to Cache 36. Flush Circuitry 100 determines whether a replay of the request has been initiated by comparing the associated Request Q ID bits 62 for each entry with the ID of the instruction just output by Scheduling Unit 24.

C. The Validation Circuit

Figure 5:
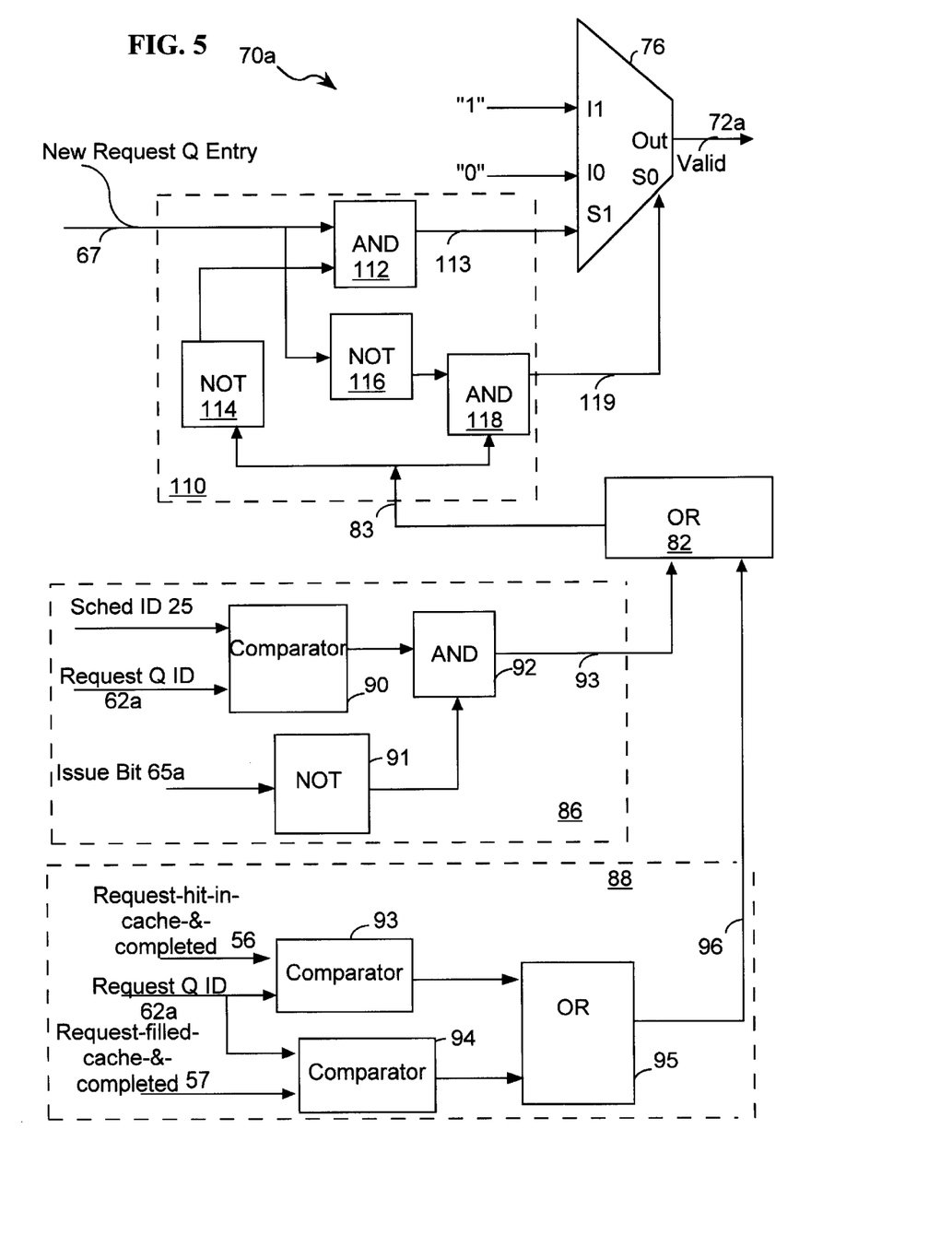
FIG. 5 illustrates an instance of an embodiment of the validation circuit of the bad address handling circuit of FIG. 4.

FIG. 5 illustrates, in block diagram form, an instance of one of the Validation Circuits 70a of Validation Circuitry 70. Validation Circuit 70a includes Mux 76, Select Control Circuit 110, Deassertion Control Circuit 82, Replay Deassertion Path 86 and Completion Deassertion Path 88. Mux 76 outputs on line 72a the Valid signal. Because the two inputs to Mux 76 are tied high and low, respectively, the state of the Valid signal is determined solely by the state of the two signals applied to the Mux select inputs, S0 and S1. The Valid signal indicates validity when the I1 input is selected, and invalidity when the I0 input is selected.

Select Control Circuit 110 controls Mux 76 via its outputs, Select One signal on line 113 and Select Zero signal on line 119. Select Control Circuit 110 ensures that only one select signal, Select Zero or Select One, is asserted at a time, thereby preventing erroneous transitions of Valid signal on line 72a. Select Control Circuit 110 asserts the Select One signal only when the New Request Q Entry signal on line 67 is asserted and the Deassertion signal on line 83 is deasserted. Assertion of the Select One signal while the Select Zero signal is deasserted causes the Valid signal to indicate that the associated request queue entry is valid. Select Control Circuit 110 asserts Select Zero signal only when the New Request Q Entry signal is deasserted and the Deassertion Signal is asserted. Assertion of the Select Zero signal while the Select One signal is deasserted causes the Valid signal to indicate that the associated request queue entry is invalid. Select Control Circuit 110 asserts neither the Select Zero signal, nor the Select One signal, whenever both the New Request Q Entry signal and the Deassertion signal are asserted. Thus, the Valid signal will not change state.

Selection Control Circuit 110 includes logical AND 112, logical NOT 114, logical NOT 116 and logical AND 118. Logical AND 112 and Logical NOT 114 control the state of the Select One signal based upon the states of the New Request Q Entry signal and the Deassertion Signal. Similarly, logical Not 116 and logical AND 118 control the state of the Select Zero signal based upon the states of the New Request Q Entry signal and the Deassertion Signal.

Deassertion Control Circuit 82 controls the state of the Deassertion signal on line 83 based upon the state of the Replay Deassertion signal on line 93 and the Completion Deassertion signal on line 96. Deassertion Control Circuit 82 asserts the Deassertion signal whenever either the Replay Deassertion signal or the Completion Deassertion signal indicates that the associated request entry is no longer valid; i.e., whenever either signal is asserted. Deassertion Control Circuit 82 may be realized as a Logical OR, as shown in FIG. 5.

Replay Deassertion Path 86 detects when its associated entry 60a should be invalidated because the same instruction is being replayed and the request has not yet issued to Cache 36. Replay Deassertion Path 86 indicates its decision via the Replay Deassertion signal on line 93. Replay Deassertion Path 86 detects bad consumer replay using Comparator 90, which compares the entry's Request Q ID bits 62a to Sched ID signal on line 25. A match indicates a replay of the request with which the entry is associated and presents a digital high voltage level at one input of Logical AND 92. Even though the request is being replayed, Deassertion Path 86 will invalidate the entry only if the request has not yet been issued to Cache 36, as indicated by Issue bit 65a. Issue bit 65a is inverted by Logical NOT 91, whose output is applied to Logical AND 92. Thus, when Issue bit 61 is low, indicating that the request has not been issued, Logical NOT 91 outputs a high voltage level to Logical AND 92. When both of its input paths carry digital high voltages, Logical AND 92 outputs a digital high voltage, indicating to Logical OR 82 that the Valid signal on line 72a should be forced to a level representative of invalidity; i.e., to a digital low signal.

Completion Deassertion Path 88 determines when its associated entry 60a should be invalidated because the request has been completed. Completion Deassertion Path 88 indicates its decision via the Completion Deassertion signal on line 96. A request may be completed by a hit in Cache 36 or by a fill of Cache 36 from Main Memory 38. Comparator 93 determines when the request associated with associated entry 60a has been completed by a hit in Cache 36 by comparing the Request-hit-in-cache-&-completed signal on line 56 with Request Q ID bits 62a. Comparator 94 determines when the request has completed because of a fill from Main Memory 38 by comparing the Request-filled-cache-&-completed signal on line 57 with the entry's Request Q ID bits 62a. When either Comparator 93 or 94 indicates a match, then the output of Logical OR 95 goes high, indicating to Logical OR 82 that the Valid signal should be forced to a level indicative of invalidity; i.e., to a digital low voltage level.

D. The Flush Circuit

Figure 6:
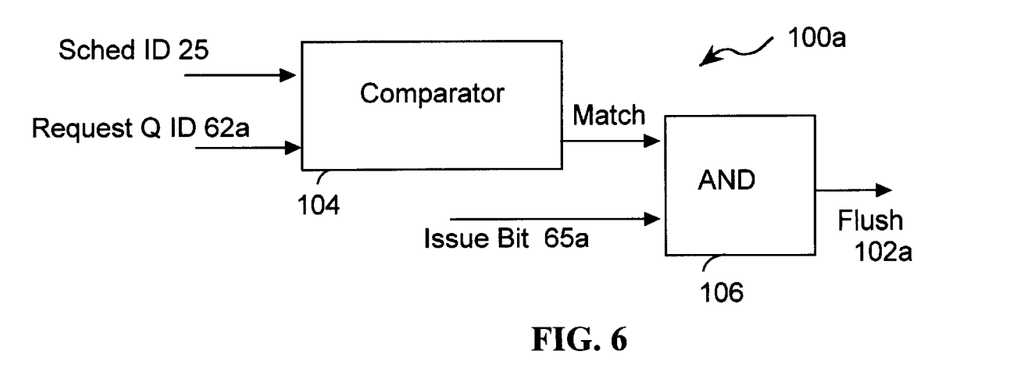
FIG. 6 illustrates an embodiment of an instance of a flush circuit of the bad address handling circuit of FIG. 4.

FIG. 6 illustrates, in block diagram form, one instance of a Flush Circuit 100a of the N instances included within Flush Circuitry 100. Flush Circuit 100a includes Comparator 104 and Logical AND 106. Comparator 104 determines whether the instruction with which the entry is associated is being replayed. Comparator 104 does so by comparing the Sched ID signal on line 25 with the entry's Request Q ID bits 62a. A match between the two indicates a replay. Given a match, the associated entry 60a should be flushed only if the request has already been issued to Cache 36 as indicated by a digital high voltage level of Issue bit 65a. Logical AND 106 forces its output, the Flush signal on line 102a, high when both Issue bit 65a and the output of Comparator 104 are a digital high.

E. Request Queue and Bad Address Handling Circuit Operation

Figure 7A:
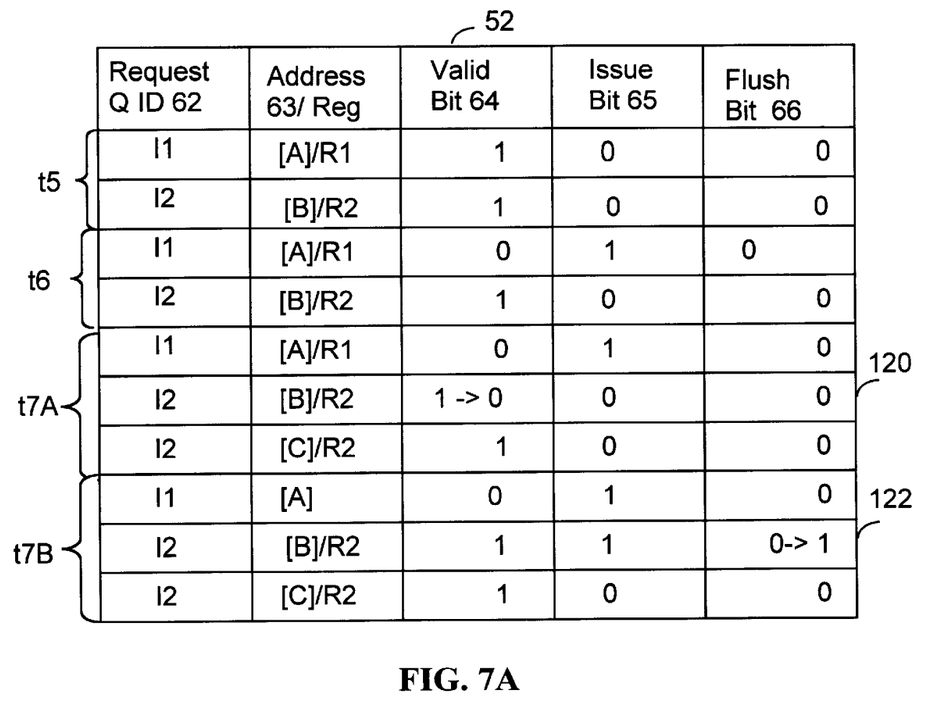
FIG. 7A illustrates, at various time, some of the contents of the request queue of the present invention.
Figure 7B:
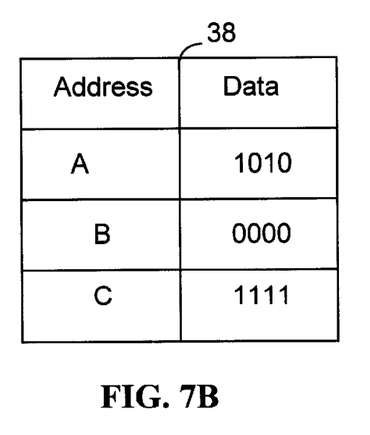
FIG. 7B illustrates some of the contents of the main memory of the processor of FIG. 3.
Figure 7C:
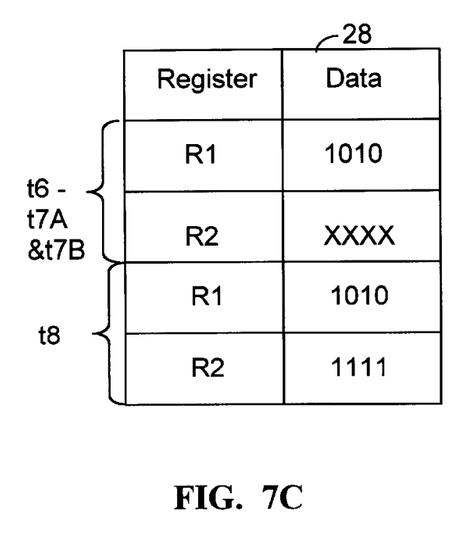
FIG. 7C illustrates, at various times, some of the contents of the register file of the processor of FIG. 3.

FIGS. 7A–C illustrate how Request Queue 52 and Bad Address Handling Circuit 54 operate to prevent register data corruption from occurring due to speculative issuance of a bad consumer load and its subsequent replay. In these figures and the following discussion, the source load request is identified as "I1". While both the bad consumer load request and its replay are assigned the ID "I2", the two can be distinguished by their addresses. Consumer load request I2 is initially issued with a bad address of B and it is subsequently determined that the correct address should have been C. Thus, in these figures the bad consumer is denoted as "I2 [B]/R2" and the replay consumer is denoted "I2 [C]/R2". At a time $\tau_5$ both I1 and I2 have been forwarded to Cache Controller 50. FIG. 7A illustrates partially the contents of Request Queue 52 at time $\tau_5$, showing that both the source and bad consumer load requests, I1 and I2, are valid and have not yet been issued to Cache 36. Sometime after $\tau_5$ and prior to $\tau_6$, source I1 completes placing the data stored at address A of Main Memory 38, illustrated in FIG. 7B, into register R1 of Register File 28. FIG. 7C reflects this showing a value of "1010" in R2 of Register File 28 at $\tau_6$. Subsequently, Scheduling Unit 24 realizes that consumer load I2 was issued with a bad address and so issues a replay request with the correct address; i.e, Scheduling Unit 24 issues "I2 [C]/R2". How Bad Address Handling Circuit 54 deals with the bad consumer, "I2 [B]/R2", upon detection of its replay depends upon the contents of Request Queue 52 at the time of replay detection.

There are two possibilities, which are both illustrated in FIGS. 7A–C. First, at time "$\tau_{7A}$" Request Queue 52 indicates that the bad consumer has not yet issued to Cache 36. This is indicated in FIG. 7A by Request Queue entry 120 and the state of its Issue Bit 65. Given this state of affairs at the time of replay detection, Bad Address Handling Circuit 54 changes the state of the Valid bit 64 of entry 120 so that it indicates that the entry is invalid. In other words, the Valid bit 64 of entry 120 changes from a "1" to a "0". Consequently, the bad consumer will not be issued to Cache 36 and data at address C of Main Memory 38 will not be written into Register R2 of Register File 28. The second possibility at the time of replay detection is that the bad consumer has been issued. In FIG. 7A the Request Queue 52 entries at time $\tau_{7B}$ represent this situation. In particular, Request Queue entry 122 represents the bad consumer, whose Issue bit 65 is set to "1". Bad Address Handling Circuit 54 responds to this situation by changing the state of the bad consumer's Flush bit 66 so that it indicates that bad consumer should be flushed. This change is indicated in FIG. 7A by a change in the state of the Flush bit 66 of entry 122 from a "0" to a "1". Consequently, when data is returned to Cache 36 in response to the bad consumer that data will not be loaded from Cache 36 into R2 of Register File 28. Thus, when the replay completes at time $\tau_8$ data from address C of Main Memory 38, illustrated in FIG. 7B, is written into register R2 of Register File 28, illustrated in FIG. 7C.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of preventing register data corruption in a processing unit that speculatively issues loads and includes a cache, the method comprising the steps of:
   a) creating an entry in a request queue for a first load request to load a first register from a first memory location;
   b) determining whether the first memory location is incorrect; and
   c) if the first memory location is incorrect, preventing issuance of the first load request to the cache if the first load request has not yet been issued to the cache.

2. The method of claim 1 wherein step (c) further comprises:
   preventing data in the cache from being loaded into the first register if the first load request has been issued to the cache.

3. The method of claim 2 wherein the request queue entry includes an issue bit and a valid bit, the issue bit having a first issue state indicating that the first load request has not been issued to the cache, the issue bit having a second issue state indicating that the first load request has been issued to the cache, the valid bit having a first valid state indicating that the first load request is valid, the valid bit having a second valid state indicating that the first load request is invalid.

4. The method of claim 3 wherein step (c) further comprises setting the valid bit to the second valid state when the issue bit is in the first issue state.

5. The method of claim 3 wherein the request queue entry includes a flush bit, the flush bit having a first flush state and a second flush state, the second flush state indicating that the first register should not be loaded with data associated with the first load request.

6. The method of claim 5 wherein step (c) further comprises setting the flush bit to the second flush state when the valid bit is in the second valid state and the issue bit is in the second issue state.

7. The method of claim 1 wherein step (b) comprises:
   b1) comparing a first identifier associated with the first load request to a second identifier associated with a second load request to load the first register from a second memory location, the second load request being issued after the first load request; and
   b2) designating the first memory location as incorrect if the second identifier matches the first identifier.

8. Circuitry associated with a cache for preventing corruption of data stored in a register of a processing unit that speculatively issues a load request to load a register with data at a first address and replays the load request with a second address, the circuitry including:
   a) a request queue having an entry for the load request to load the register with data stored at the first address, the request queue entry including a valid bit, an issue bit, and a flush bit, the valid bit indicating whether the load request should be issued to the cache, the issue bit indicating whether the load request has been issued to the cache, the flush bit indicating whether the data from the cache associated with the first address should be loaded into the register; and
   b) bad address handling circuitry coupled to the request queue for modifying the entry in response to the replay of the load request, the bad address handling circuitry including:
      1) a validation circuit for modifying a state of the valid bit in response to the replay of the load request based upon a state of the issue bit and; and
      2) a flush circuit for controlling a state of the flush bit in response to the replay of the load request based upon the state of the issue bit.

9. The circuitry of claim 8 wherein the validation circuit comprises:
   b1A) a multiplexer having a first mux input, a second mux input, a mux output and a mux select input, the multiplexer coupling a one of the first mux input and the second mux input to the mux output in response to the select input, a voltage level of the mux output being indicative of the state of the valid bit; and b1B) a replay deassertion path having an output coupled to the mux select input, the replay deassertion path having a first replay deassertion path input coupled to a replay signal and having a second replay deassertion path input coupled to the issue bit, the replay deassertion path determining a voltage level coupled to the output in response to the replay signal and the issue bit.

10. A controller for a cache for preventing corruption of data stored in a register of a processing unit that replays speculatively issued load requests with incorrect addresses, the controller including:

a) a request queue having an entry for a first load request to load the register with data stored at a first address, the request queue entry including ID bits, address bits, a valid bit, an issue bit, and a flush bit, the ID bits representing an ID of the first load request, the address bits representing the first address, the valid bit indicating whether the first load request should be issued to the cache, the issue bit indicating whether the first load request has been issued to the cache, the flush bit indicating whether the data from the cache associated with the first address should be loaded into the register; and    b) bad address handling circuitry coupled to the request queue for modifying the request queue entry in response to a second load request to load the register with data at a second address, the second load request having a same ID as the first load request, the bad address handling circuit including:

1) a validation circuit for modifying a state of the valid bit in response to the ID of the second load request matching the ID of the first load request, the validation circuit modifying the state of the valid bit based upon a state of the issue bit; and      2) a flush circuit for modifying a state of the flush bit in response to the ID of the second load request matching the ID of the first load request, the flush circuit modifying the state of the flush bit based upon the state of the issue bit.

11. The circuitry of claim 10 wherein a scheduled ID signal represents the ID of the second load request and wherein the validation circuit comprises:

b1A) a multiplexer having a first mux input, a second mux input, a mux output and a mux select input, the multiplexer coupling a one of the first mux input and the second mux input to the mux output in response to the select input, a voltage level of the mux output being indicative of the state of the valid bit; and    b1B) a replay deassertion path having an output coupled to the mux select input, the replay deassertion path having a first replay deassertion path input coupled to the ID bits of the entry, a second replay deassertion path input coupled to the scheduled ID signal, and a third replay deassertion path input coupled to the issue bit.

* * * * *